United States Patent Office 3,267,802
Patented August 23, 1966

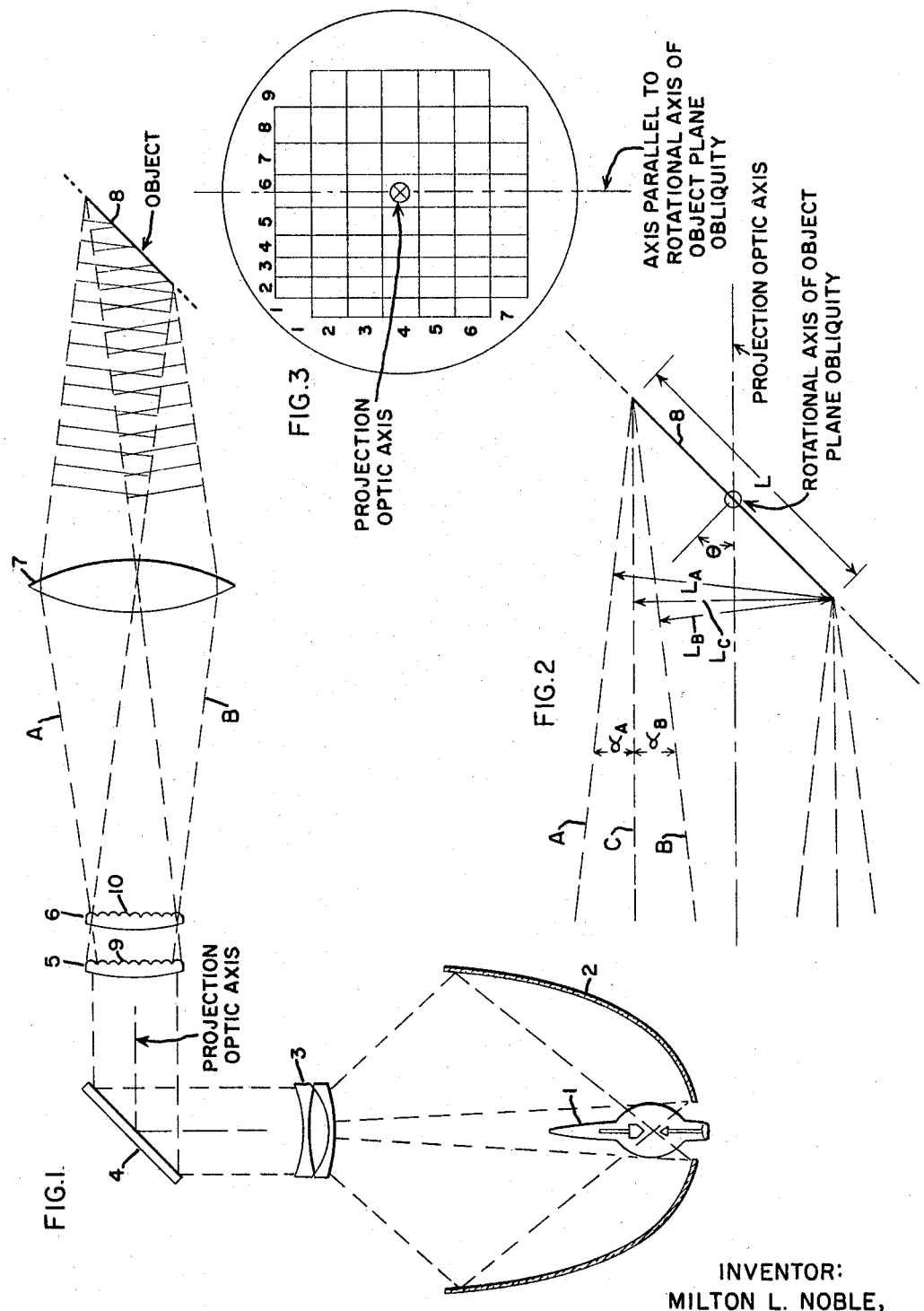

3,267,802
LENTICULATED COLLIMATING CONDENSING SYSTEM FOR OBLIQUE OBJECT PLANES
Milton L. Noble, Liverpool, N.Y., assignor to General Electric Company, a corporation of New York
Filed Jan. 4, 1965, Ser. No. 422,909
6 Claims. (Cl. 88—24)

The invention relates to light condensing systems as they apply to light projection systems, and more particularly, to a novel lenticulated collimating condensing system for uniformly illuminating objects that are obliquely arranged with respect to the projection system optic axis. The condensing system of the invention provides an illumination uniform both in intensity and angular spread over the oblique object surface.

The invention herein disclosed is related to and modifies the invention of a copending application entitled Lenticulated Collimating Condensing System, Ser. No. 422,908, filed January 4, 1965 by John R. Miles, and assigned to the assignee of the present invention. In the referenced application there is described a lenticulated condensing system which provides a uniform intensity and uniform angular spread illumination of the object to be projected. The requirement for a uniform angular spread is important in light projection systems wherein the light modulation is a function of the incident angle of light striking the object.

Although the condensing system of the referred to Miles copending application obtains substantial improvement in angular uniformity of the light incident upon the object as compared to prior lenticular optical systems of the type under consideration, it is of optimum effectiveness in gaining intensity uniformity over an object plane that is normal to the optic axis of the projection system. If the object plane must be at an oblique angle with respect to the optic axis some diminution in intensity uniformity occurs as a function of the angle obliquity. A system of this type wherein the object plane is necessarily obliquely arranged is described in copending application for U.S. Letters Patent Ser. No. 222,844, filed Sept. 11, 1962, by Milton L. Noble, entitled Total Internal Reflection Projection System, and assigned to the assignee of the present invention. Although it has been found that the Miles system offers considerable advantage in its application to the projection system disclosed in the Noble patent application, the intensity uniformity of the display is not optimized.

It is accordingly an object of the present invention to provide for use in a light projection system wherein the light modulation is a function of the incident angle of light upon an object plane that is at an oblique angle to the optic axis of the system, a lenticulated collimating condensing system which provides an illumination of uniform intensity and uniform and restricted angular spread over the entire object.

It is a further object of the present invention to provide a lenticulated collimated condensing system as above described which is of relatively simple and inexpensive optical construction.

These and other objects of the invention are accomplished in a lenticulated collimated condensing system of the type which includes first and second axially spaced lenticular lens plates and a large aperture convering lens arranged in the order recited between the system's light source and the object to be projected. The object plane is obliquely disposed with respect to optic axis of the system. The lens elements of the first lenticular plate converges the light directed thereto from the light source into crossovers at the apertures of corresponding lens elements of the second lenticular lens plate. The lens elements of the second lenticular lens plate produce an array of diverging light beams each striking a different portion of the converging lens. The converging lens collimates each of the beams along converging principal axes so as to superimpose said beams onto the object.

In accordance with the invention, the dimensions of the individual lens elements of at least the first lenticular lens plate in the direction orthogonal to the axis of rotation of the object plane obliquity are geometrically proportioned as a function of the oblique angle of said object plane and the incident angle of the collimated light beams impinging on said object so that the collimated light beams are congruently superposed upon the object. The geometric variations of the dimensions of the individual lens elements, as described, proportionately modify the cross sectional dimensions of the individual light beams emanating from the lens elements of the second lenticular lens plate so that the collimated light beams resulting therefrom have cross sectional dimensions corresponding to the projection of the object onto the plane of cross section of each of the beams, While the specification concludes with claims particularly pointing out and distinctly claiming the invention, it is believed that the invention will be better understood from the following description taken in connection with the accompanying drawings in which:

FIGURE 1 is a schematic illustration in plan view of a lenticulated collimated condensing system in accordance with the invention;

FIGURE 2 is a schematic illustration of the oblique object plane and the light beams incident thereon, illustrating by a geometric construction the manner in which the dimensions of the lenticular plate lens elements are determined; and FIGURE 3 is a front view of a single lenticular lens plate of FIGURE 1 illustrating the geometrical configuration of the individual lens elements of said plate.

Referring now to FIGURE 1, there is schematically illustrated, in plan view, a lenticulated collimating condensing system for use in light projection systems employing light sources of nonuniform intensity illumination properties and wherein the object plane is obliquely arranged with respect to the system optic axis. The condensing system provides a uniform intensity illumination of the oblique object, in addition to providing a uniform and restricted angular spread of the light incident upon the object. The system basically includes a source 1 of high brightness energy, an elliptical mirror 2 positioned to the rear of the source 1 for giving direction to the generated light energy, a conventional collimating lens 3, a cold mirror 4, a first lenticular lens plate 5, a second lenticular lens plate 6, a large aperture converging lens 7 and the projected object 8.

The light source 1 may be composed of any one of a number of conventional luminous devices used in projection apparatus. In one operating embodiment a 2,000 watt xenon arc lamp was employed. The elliptical reflector 2 is a conventional optical component for directing the light emitted from said source into the collimating lens means 3. Collimating means 3 may comprise typically a pair of negative combination collimating lenses which receive light from over a wide angle and transform it into a collimated beam along the projection optic axis. The collimated light is intercepted by the cold mirror 4 which extracts a large measure of infrared energy from the light by transmitting the infrared wavelengths and reflecting the visible wavelengths. The reflected light beam is rotated by 90° from its original direction and directed toward the lenticular lens plates 5 and 6. Since the emission from the source 1 is characteristically of uneven intensity, e.g., due to the lamp's electrode structure which blocks light energy from the central region of the light beam, and also the non-uniform radiation pattern of the emitted energy, the collimated beam thus far formed is of uneven intensity throughout its cross section.

The first lenticular lens plate 5 includes at its output surface an array of abutting individual lens elements 9, each of which is a small spherical lens. As will be described presently when referring to FIGURE 3, the dimensions of the individual lens elements are proportioned as a function of the obliquity of the object plane and the incident angle of light at the object for modifying the light transmitted therethrough. The second lenticular lens plate 6 includes at its output surface a similar array of comparably shaped individual lens elements 10, for every lens element 9 there being a corresponding lens element 10. Although for purposes of the invention it is necessary to proportionally dimension only the lens elements 9, in practice, the lens elements 10 are similarly proportioned because of spatial considerations, so that the lenticular lens plates 5 and 6 can be readily fabricated to provide the necessary correspondence between their lens elements.

The lenticular lens plates 5 and 6 are spaced apart by approximately the local length of the lens elements 9 so that the light energy transmitted through each of the elements 9 converges and forms a crossover at approximately the center of the entrance to the corresponding elements 10. In this manner light is efficiently transmitted from the first lenticular plate 5 to the second lenticular plate 6. The lens elements 10 of the second lenticular plate 6 each produce a diverging light beam, which beams are intercepted by different portions of the converging lens. Only the two outermost diverging light beams are illustrated in FIGURE 1. The input surfaces of the lenticular lens plates 5 and 6 can be slightly convex, as shown, which has a converging effect on the propagated light, thereby allowing the employment of a smaller aperture lens 7 than would be otherwise required. For such configuration, the lens elements 10 are proportionately slightly smaller than the lens elements 9.

The lens 7 is positioned from the lenticular plate 6 at a distance approximately equal to its focal length so that the received diverging light beams, each having crossovers approximately in the plane of the lenticular plate 6, become collimated. However, since the individual diverging light beams are incident upon different portions of the lens 7 of dissimilar curvature, light beams exiting from the lens 7 are collimated along converging principal axes. This condition is diagrammatically illustrated in FIGURE 1 wherein the upper diverging beam A is transposed into a downwardly directed collimated beam and the lower diverging light beam B is transposed into an upwardly directed collimated light beam. It may be appreciated that light beams from the intermediate lens elements 10, which beams are not shown, pass through intermediate portions of the lens 7 and are collimated along principal axes that are successively closer to the projection optic axis of the system, as a function of the distance of their crossover points from said optic axis.

Because the object plane is disposed at an oblique angle with respect to the system optic axis, the employment of conventional lenticular lens plates for the plates 5 and 6 having individual lens elements that are uniform in size and shape results in a nonuniform intensity illumination of the object. In accordance with the invention, the configuration of the individual lens elements 9 and 10 are modified so as to provide at the oblique object an optimum superposition of the beams emanating from said lens elements. More specifically, the dimensions of the individual lens elements of each lenticular plate which are in the direction orthogonal to the axis of the rotation of the object plane obliquity are geometrically proportioned as a function of said object plane obliquity and the incident light angle to provide cross sectional dimensions of each collimated light beam equal to the projection of the object onto the plane of the beam cross section, with the principal axes of the light beams intersecting at approximately the center of the object. In this manner, a congruent superposition of the incident light beams on the oblique object, and therefore a uniform intensity illumination of the object, is accomplished.

Referring to FIGURE 2, there will now be considered the geometric construction employed in determining the proportional dimensioning of the lens elements 9 and 10. Illustrated in FIGURE 2 is a plan view of the oblique object 8 and three collimated light beams incident thereon, beams A and B of FIGURE 1 and an on-axis beam C. The principal axes of beams A and B make an angle $\alpha_A$ and $\alpha_B$, respectively, with the projection optic axis. In the view shown, the principal axis of the collimated beam C is coaxial with the optic axis.

The object plane is disposed at an oblique angle $\beta$ with respect to the projection optic axis. Accordingly, the object plane is rotated by an angle $\theta$ with respect to a plane normal to the optic axis, $\theta$ and $\beta$ being complementary angles and $\theta$ the angle of incidence for on-axis light. The dimension of the object in the direction orthogonal to the axis of rotation of the object plane obliquity is given as L. The projections of the object onto the planes of cross-section of beams A, B and C are $L_A$, $L_B$ and $L_C$, respectively.

Thus, the following expressions can be written $$\cos \theta = \frac{L_C}{L} \quad (1)$$

$$\cos (\theta - \alpha A) = \frac{L_A}{L} \quad (2)$$

and $$\cos (\theta + \alpha_B) = \frac{L_B}{L} \quad (3)$$

For assigned values of $\theta$, $\alpha_A$ and $\alpha_B$, the ratio of $L_C:L_A:L_B$ can be readily derived.

In one exemplary embodiment, the following values were employed: $L=50$ mm., $\theta=45°$ and $\alpha_A=\alpha_B=5°$. This yields $L_A=38.30$ mm., $L_B=32.15$ mm. and $L_C=35.35$ mm. The dimensions of the lenticular lens elements 9 and 10 in the direction orthogonal to the axis of rotation of the object plane obliquity are proportioned accordingly. In the direction parallel to the rotational axis the dimensions of the individual lens elements are approximately equal.

It is noted that expressions similar to 1, 2 and 3 above can be written for the parallel lens element dimensions. However, since the rotational axis is normal to the projection optic axis the angle $\theta$ in such expressions would equal zero, and for normally small angles $\alpha$ the differences in the computed parallel dimensions would be so slight as to be negligible.

The construction of an exemplary lenticular lens plate in accordance with the invention is illustrated in FIGURE 3 in which there are a maximum of nine lens elements across the width and seven across the height of the lenticular plate. The elements are identified by rows and columns. It is seen that the lens elements in each column are of similar dimensions, and that the width is geometrically proportioned from column to column, as above indicated. Thus, there is a constant ratio of width to height of the lens elements in the vertical direction and a varying ratio in the horizontal direction. For the above ratios of $L_A:L_B:L_C$, and if it is assumed that the object is of a square configuration, the width to height ratio of the individual lens elements is 38.3/50 for the lens elements of column 9 from which beam A emanates, 30.35/50 for the lens elements of column 6 from which beam C emanates and 32.15/50 for the lens elements of column 1 from which beam B emanates. The intermediate lens elements of columns 2 to 5, which with the elements of column 1 are to one side of the plane formed by the projection optic axis and the object rotational axis, toward which the object is rotated, have proportional dimensions between the values for columns 1 and 6. The intermediate lens elements of columns 7 and 8, which with the elements of column 9 are to the other side of said plane, away from which the object is rotated, have proportional dimensions between the values for columns 6 and 9.

Although a specific embodiment has been presented for purposes of clear and complete disclosure, it is not intended that the invention should be thus limited. Accordingly, the individual lens elements of lenticular plates 5 and 6 may assume any shape desired in addition to being generally rectangular as shown, wherein the dimensions of said lens elements in the direction orthogonal to the axis of object obliquity are geometrically proportioned as hereinbefore indicated. The appended claims are intended to embrace all modifications that fall within the true scope and spirit of the invention.

What I claim as new and desire to secure by Letters Patent of the United States is:

1. A light condensing system for uniformly illuminating a projection object in a plane disposed at an oblique angle with respect to the optic axis of the system, comprising:
   (a) a light source,
   (b) a first lenticular lens plate including a first multiplicity of lens elements,
   (c) a second lenticular lens plate having a second multiplicity of lens elements corresponding to said first multiplicity, said lenticular lens plates being spaced apart and coaxially arranged so as to intercept the light energy emitted from said source and produce an array of diverging light beams, one beam for each pair of corresponding lens elements, at least said first multiplicity of lens elements being nonuniform and having dimensions in the direction orthogonal to the rotational axis of object plane obliquity which are geometrically proportioned so as to modify the cross sectional configuration of said light beams, and
   (d) lens means disposed between said lenticular lens plates and said projection object for collimating said light beams along converging principal axes, the geometrically proportioned dimensions of the nonuniform lens elements providing a superposition of the collimated light beams upon said object, thereby obtaining a uniform intensity, uniform angular spread illumination of the object.

2. A light condensing system as in claim 1 wherein said geometrically proportioned dimensions are a function of the object plane obliquity and the incident angle at the object of the light beams associated with each pair of corresponding lens elements.

3. A light condensing system as in claim 2 wherein $\theta$ is the complement of the object plane oblique angle and $\alpha$ is the angle made at the object surface between each collimated beam principal axis and the system optic axis, said geometrically proportioned dimensions being a function of $\cos(\theta+\alpha)$ for the nonuniform lens elements to one side of the plane formed by the optic axis and the rotational axis toward which the object is rotated and a function of $\cos(\theta-\alpha)$ for the nonuniform elements to the other side of said plane away from which the object is rotated.

4. A light condensing system for uniformly illuminating a projection object in a plane disposed at an oblique angle with respect to the optic axis of the system, comprising:
   (a) a light source,
   (b) a first lenticular lens plate including at the output surface thereof a first multiplicity of lens elements,
   (c) means for directing light energy from said source to the input surface of said lenticular lens plate,
   (d) a second lenticular lens plate including at the output surface thereof a second multiplicity of lens elements corresponding to said first multiplicity, said first and second lenticular lens plates being coaxially arranged and spaced apart by a distance approximately equal to the focal length of said first multiplicity so tht light received by said first lenticular lens plate is focused into crossovers at the apertures of corresponding elements of said second multiplicity, the second multiplicity of lens elements thereby producing an array of diverging light beams, one beam for each pair of corresponding lens elements, at least said first multiplicity of lens elements being nonuniform and having dimensions in the direction orthogonal to the rotational axis of object plane obliquity which are geometrically proportioned so as to modify the cross sectional configuration of said light beam, and
   (e) a large aperture converging lens disposed between said second lenticular lens plate and said projection object at a distance from said second lenticular lens plate approximately equal to the focal length of said converging lens, said converging lens receiving said diverging light beams at different portions of its input surface and collimating said light beams along converging principal axes, the geometrically proportioned dimensions of the nonuniform lens elements providing a superposition of the collimated light beams upon said object, thereby obtaining a uniform intensity, uniform angular spread illumination of the object.

5. A light condensing system as in claim 4 wherein said geometrically proportioned dimensions are a function of the object plane obliquity and the incident angle at the object of the light beams associated with each pair of corresponding lens elements.

6. A light condensing system as in claim 5 wherein $\theta$ is the complement of the object plane oblique angle and $\alpha$ is the angle made at the object surface between each collimated beam principal axis and the system optic axis, said geometrically proportioned dimensions being a function of $\cos(\theta+\alpha)$ for the nonuniform lens elements to one side of the plane formed by the optic axis and the rotational axis toward which the object is rotated and a function of $\cos(\theta-\alpha)$ for the nonuniform elements to the other side of said plane away from which the object is rotated.

References Cited by the Examiner

UNITED STATES PATENTS

| 2,183,249 | 12/1939 | Schering et al. | 88—24 |
| 2,186,123 | 1/1940 | Rantsch et al. | 88—24 |
| 2,326,970 | 8/1943 | Rantsch | 88—24 |
| 2,803,163 | 8/1951 | Ulffers | 88—24 |
| 2,991,691 | 7/1961 | Schering | 352—198 |

FOREIGN PATENTS

| 741,246 | 11/1955 | Great Britain. |
| 818,229 | 8/1959 | Great Britain. |

NORTON ANSHER, *Primary Examiner.*